United States Patent [19]

Kane et al.

[11] 3,773,635

[45] Nov. 20, 1973

[54] PROCESSING OF MANGANESE NODULES FROM THE OCEAN FLOOR FOR METAL VALUES

[75] Inventors: William S. Kane, Wicomico; Paul H. Cardwell, Zanoni, both of Va.

[73] Assignee: Deepsea Ventures, Inc., Gloucester Point, Va.

[22] Filed: Sept. 29, 1971

[21] Appl. No.: 184,771

Related U.S. Application Data

[63] Continuation-in-part of Ser. No. 40,587, May 26, 1970.

[52] U.S. Cl. ............ 204/105 M, 204/107, 204/113, 75/101 BE, 75/117, 75/119, 75/121
[51] Int. Cl. ....... C22d 1/24, C22d 1/16, C22d 1/14
[58] Field of Search ............ 204/105, 107, 112–113, 204/117, 39, 64, 105 M; 75/111–114, 117, 119, 120, 121, 101 BE; 23/121, 89; 423/633

[56] References Cited
UNITED STATES PATENTS 3,466,169  9/1969  Nowak et al. ..................... 75/112
3,374,090  3/1968  Fletcher et al. ................... 75/119
3,169,856  2/1965  Mero ................................. 75/119

*Primary Examiner*—John H. Mack
*Assistant Examiner*—R. L. Andrews
*Attorney*—Daniel J. Reardon, Barry G. Magidoff and Evelyn Berlow

[57] ABSTRACT

Method for recovering metal values from ocean floor nodules of the type containing iron, manganese, copper, cobalt, and nickel comprising grinding the nodules into particles, chlorinating to obtain vaporized metal chlorides and oxides of carbon or water as reaction products, condensing the metal chloride reaction products, converting the iron chloride to iron oxide while leaching the remaining reaction products with water, separating the metal chlorides by liquid ion exchange, and recovering metal values by electrolyzing. The process is distinguished in its capability of condensing the metal chloride products in fractions.

14 Claims, 4 Drawing Figures

HYDROCHLORINATION

INVENTORS
WILLIAM S. KANE
PAUL H. CARDWELL

PROCESSING OF MANGANESE NODULES FROM THE OCEAN FLOOR FOR METAL VALUES

CROSS-REFERENCES TO RELATED APPLICATIONS

This is a continuation-in-part application of Applicant's PROCESSING OF MANGANESE NODULES FROM THE OCEAN FLOOR FOR METAL VALUES, Ser. No. 40,587, filed May 26, 1970.

BACKGROUND OF THE INVENTION:

1. Field of the Invention

A great deal of recent attention has been directed to the harvesting of ocean floor nodules and extraction of their principal metal values including manganese, copper, cobalt, and nickel. Earlier inventors have attempted removal of one or more of these metal values but, apparently, have been unable to isolate and remove selectively the manganese, copper, cobalt, and nickel values. Also, industries have hydrochlorinated ores so as to remove nickel, cobalt, and manganese. However, these processes have been mostly restricted to removal of one or, at the most, two of these metals, the raffinate or residue solution having been discarded as waste.

2. Description of the Prior Art

Prior art searching has developed:
Daubenspeck, U.S. Pat. No. 2,733,983;
Graham, U.S. Pat. No. 2,766,115.
Both patents relate to chlorination processes so as to obtain metal chlorides as reaction products. However, neither patent relates to the production of solid manganese chloride which may be fed directly to an electrolytic cell.

SUMMARY OF THE INVENTION

According to the present invention, the ocean floor nodules are ground, mixed with coal, and heated, while flowing chlorine against the mixture so as to form as vaporized reaction products: manganese chloride, iron chloride, nickel chloride, cobalt chloride, copper chloride, and carbon dioxide. By controlled heating in sequential steps, in one fraction iron and copper chlorides may be vaporized with small amounts of nickel, cobalt, and manganese and in yet another fraction, the remaining nickel and cobalt chlorides are vaporized with 30 to 60 percent of the managanese. Thirdly and at the highest temperatures, the remaining manganese chloride is vaporized. Alternatively, the coal may be eliminated and hydrogen chloride or carbon monoxide may be flowed against the mixture to obtain the reaction products.

DESCRIPTION OF THE PREFERRED EMBODIMENTS

Applicants have developed a technique for reacting the ground nodules with chlorine in the presence of carbon to give metal chlorides which can be removed from the reaction by vaporization. A partial separation of the metal chloride can be obtained during the vaporization. A principal advantage of the technique is that there are no by-products such as sodium sulfate and chlorine which are produced by various hydrochlorinating processes. A good majority of the manganese chloride is never dissolved in water from which it must be recovered.

Figure 1:
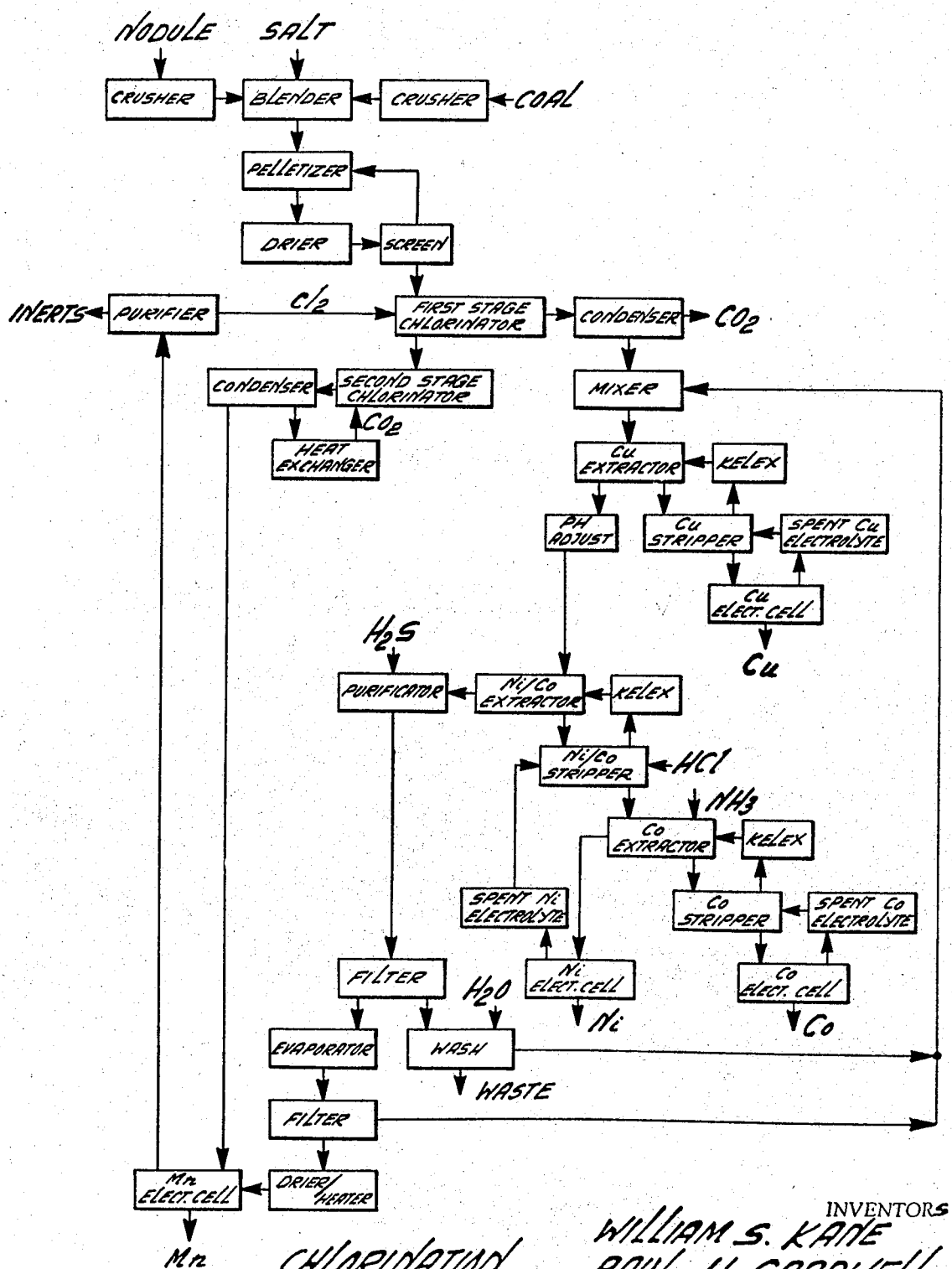
FIG. 1, is a flow sheet depicting the present process.
Figure 2:
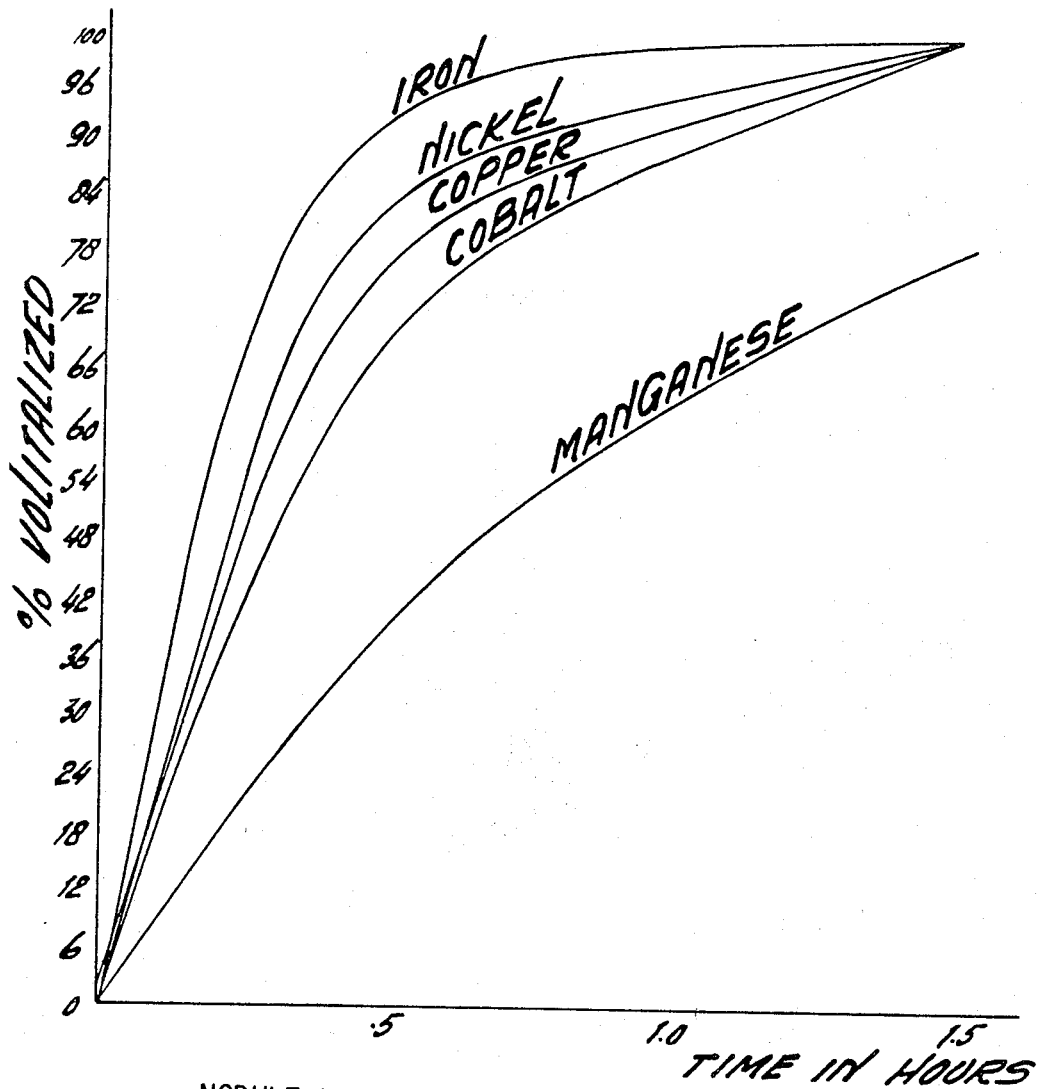
FIG. 2, is a graph, showing vaporization of the metal chlorides from the nodules using coal and hydrogen chloride from sodium chloride and sulfuric acid with chlorine as the carrier gas.
Figure 3:
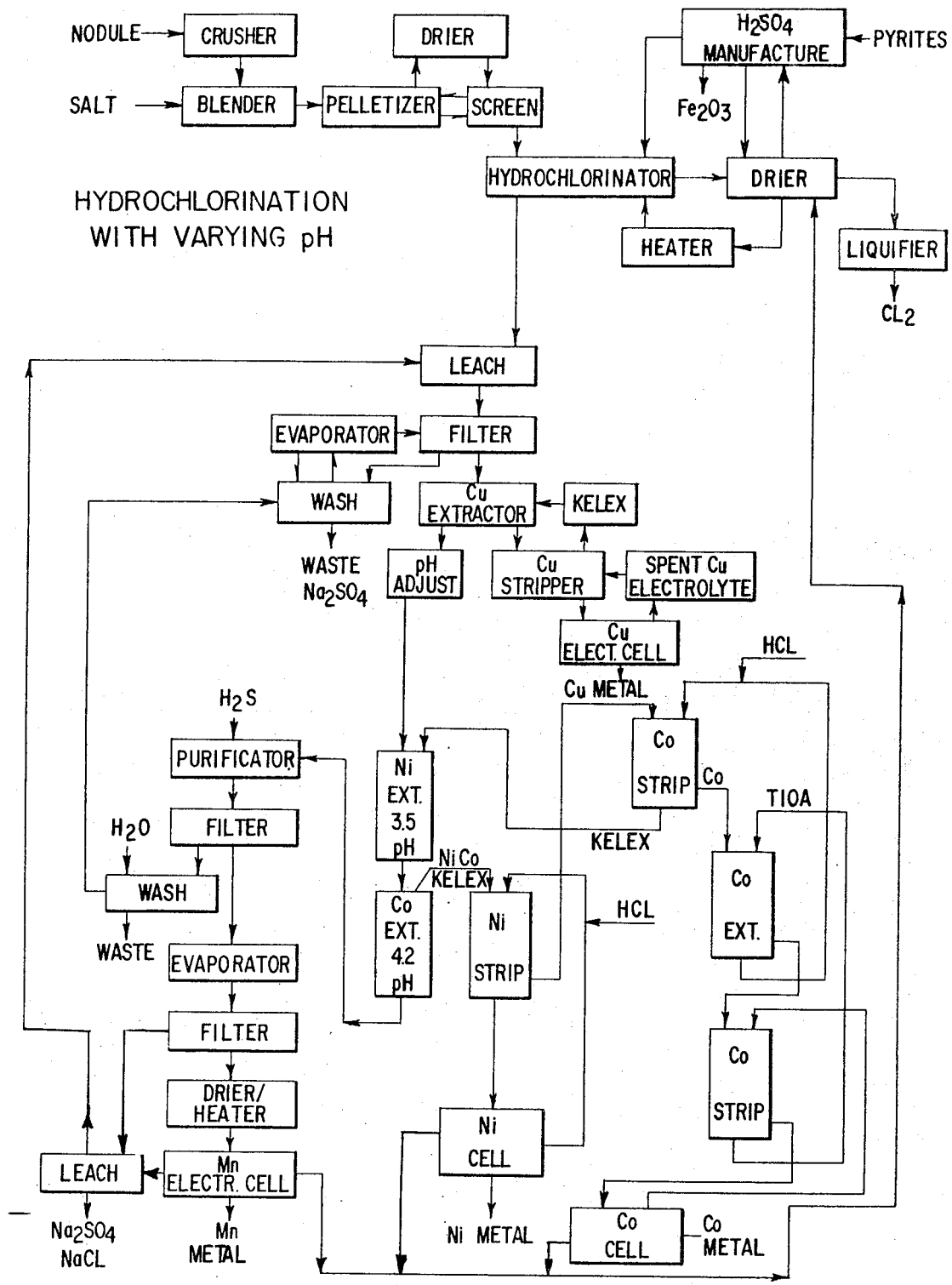
FIG. 3, is a flow sheet, entitled "Hydrochlorination with varying pH" and depicting the extraction of metal values using a liquid ion exchange reagent.

In the present chlorination process illustrated schematically in FIG. 1, the nodules are mixed with coal and heated to 700° to 1,100° C, with the preferred temperature in the range of 800° to 1,000° C.

Figure 4:
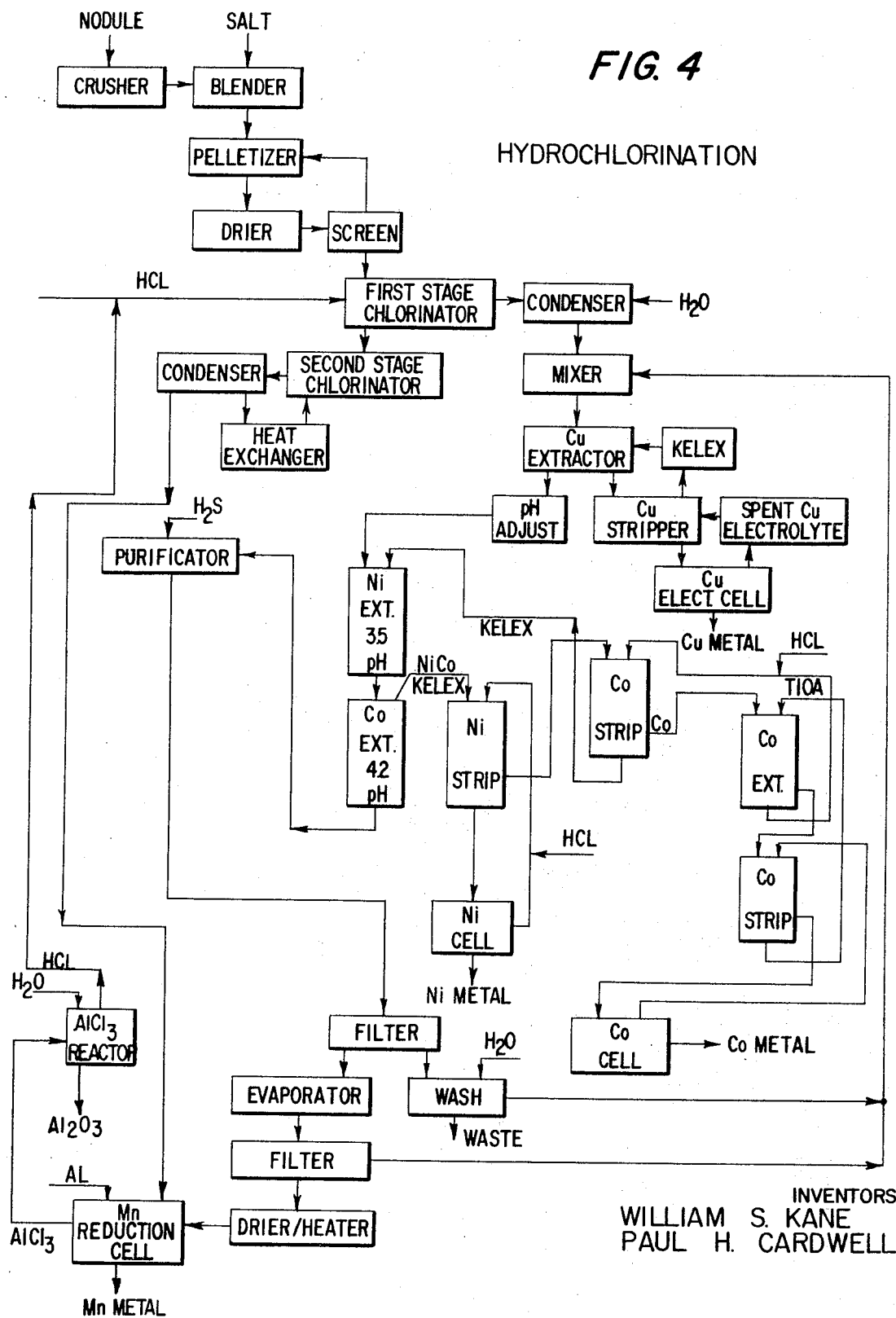
FIG. 4, is a flow sheet depicting hydrochlorination of nodules in the absence of coal and according to the present process.

The reaction with coal and chlorine with the nodules, alternatively the reaction of the nodules with hydrogen chloride as in FIG. 4, is to form the chlorides of manganese, iron, nickel, cobalt, copper and other minor metals along with the oxides of carbon and water. At the temperature of the reaction the metal chlorides are vaporized and are removed from the reaction mass by the gases which are present, namely chlorine, water vapor, carbon dioxide, and carbon monoxide or chlorine and water vapor.

The vaporization step can be operated in several ways. All of the metal chlorides can be removed and condensed together or the metal chlorides can be condensed into fractions. For example, the fraction condensed above 800° C. will contain essentially manganese chloride about 40 to 60 percent of the amount present in the nodule. The fraction collected from 550° to 800° C. will contain the majority of the nickel and cobalt chlorides with the remainder of the manganese chloride. The third fraction, collected below 550° C. will be essentially iron chloride and copper chloride with minor amounts of nickel chloride and cobalt chloride.

The fraction or fractions containing the iron chloride are subjected (1) to water vapor to convert the iron to oxide and hydrogen chloride or (2) to oxygen to form iron oxide and chlorine.

The fractions which are mixtures of metal chlorides are leached with water, and the metal chlorides are separated by liquid ion exchange as described in applicants' prior hydrochlorination process application. From this point on, the chlorination process is the same as the hydrochlorination process.

There is another variation in the chlorination process other than condensing the vapors into fractions. This is to heat the nodule and coal mixture in the presence of chlorine at different temperatures. For example, at a temperature of 400° to 550° C., iron and copper chlorides are vaporized with small amounts of nickel, cobalt, and manganese chlorides. If the temperature is raised to the range of 550° to 800° C., the remainder of the nickel and cobalt chlorides are vaporized with some 30 to 60 percent of the manganese chloride. Raising the temperature still further to 800° to 1,000° C., nearly pure manganese chloride is vaporized.

Those remaining vaporized reaction products which are condensed as mixtures are leached with warm water and the individual metal chlorides separated by a liquid ion exchange reagent such as Kelex or LIX, as in the parent application.

The attached graph depicts vaporization of the metal chlorides from the nodules using coal and hydrogen chloride with chlorine as the carrier gas.

Instead of flowing water vapor, the reaction products may be leached with water, so as to obtain a pregnant leach liquor. Then, the leach liquor may be injected with caustic so as to convert iron chloride to iron oxide.

We claim:

1. Method of processing ocean floor nodules for metal values comprising
   A. contacting said nodules with coal and chlorine so as to form as vaporized chloride reaction products
      1. manganese chloride
      2. iron chloride
      3. nickel chloride
      4. cobalt chloride and
      5. copper chloride; and
      6. oxides of carbon;
   B. separating said chloride reaction products from any solid residue and condensing the chloride reaction products;
   C. contacting the chloride reaction products with water vapor so as to convert iron chloride to iron oxide;
   D. leaching the reaction products with water so as to obtain a pregnant leach liquor and separating the pregnant leach liquor from iron and other solid residues;
   F. contacting the pregnant leach liquor with a liquid ion exchange reagent selective for one of the metals so as to extract said metal into the exchange reagent leaving a raffinate solution, then stripping said isolated metal into an aqueous solution from said exchange reagent; and
   G. cathodically electroplating isolated metal in solution so as to win said isolated metal.

2. Method according to claim 1 wherein the nodules, coal and chlorine are contacted at a temperature in the range of from 700° to 1,100° C.

3. Method according to claim 2 wherein the nodules, chlorine and coal are contacted at a temperature in the range of from 800° to 1,000°C.

4. Method of claim 1 wherein the temperature of the mixed nodules chlorine and coal is varied so as to separately vaporize desired fractions of metal chlorides.

5. Method of processing ocean floor nodules for metal values as in claim 1, wherein said condensing is in fractions substantially as follows:
   i. manganese chloride;
   ii. nickel chloride, cobalt chlorides, and some manganese chloride;
   iii. iron chloride and copper chloride.

6. Method according to claim 5 wherein the manganese chloride is cathodically electroplated so as to win manganese metal.

7. Method of processing ocean floor nodules for metal values as in claim 1, wherein said condensing is in fractions substantially as follows:
   i. manganese chloride; and
   ii. mixtures of other metal chlorides, including some manganese chloride.

8. Method of processing ocean floor nodules for metal values as in claim 1, wherein said condensing is in fractions substantially as follows:
   i. iron chloride; and
   ii. mixtures of other metal chlorides.

9. Method of processing ocean floor nodules for metal values as in claim 1, wherein said heating is at various levels so as to vaporize said reaction products in fractions.

10. Method of recovering metal values from ocean floor nodules comprising
    A. contacting said nodules with coal and chlorine at elevated temperatures so as to form as vaporized chloride reaction products
       1. manganese chloride
       2. iron chloride
       3. nickel chloride
       4. cobalt chloride and
       5. copper chloride; and
       6. oxides of carbon;
    B. separating the vaporized reaction products from the reacted ore, condensing the vaporized chloride reaction products and contacting the reaction products with oxygen to convert iron chloride to iron oxide and chlorine;
    C. leaching the condensed reaction products with water to form a pregnant leach liquor and separating the leach liquor from insoluble solid residue comprising the iron oxide;
    D. contacting the pregnant leach liquor with a liquid ion exchange reagent selective for one of the metals so as to extract said metal into the exchange reagent leaving a raffinate solution and then stripping said isolated metal into an aqueous solution from said exchange reagent; and
    E. cathodically electroplating said isolated metal in solution so as to win said isolated metal.

11. Method according to claim 10 wherein the nodules, coal and chlorine are initially heated to a temperature from about 400° to about 550°C. so as to vaporize a fraction comprising iron chloride and copper chloride as principal components and small amounts of nickel, cobalt and manganese.

12. Method of processing ocean floor nodules for metal values as in claim 11, including first sequential heating in the range 550° to 800° C., so as to vaporize the remainder of the nickel and cobalt chlorides together with 30 to 60 percent manganese chloride.

13. Method of processing ocean floor nodules for metal values, as in claim 12, including second sequential heating in the range 800° to 1,000° C., so as to vaporize the remaining manganese chloride.

14. Method of recovering metal values from ocean floor nodules comprising:
    A. contacting nodules with hydrogen chloride vapor at elevated temperatures so as to form as vaporized reaction products
       1. Manganese chloride
       2. Iron chloride
       3. Nickel Chloride
       4. Cobalt Chloride
       5. Copper Chloride
    B. separating said reaction products from the reacted ore, condensing the vaporized reaction products and contacting the reaction products with water vapor so as to convert iron chloride to iron oxide;
    C. leaching the condensed chloride reaction pruducts with water to form a pregnant leach solution;
    D. separating the pregnant leach solution from any solid residue, comprising iron oxide;

E. contacting the pregnant leach liquor with a liquid ion exchange reagent selective for one of the metals so as to extract said metal into the exchange reagent leaving a raffinate solution then stripping said isolated metal into an aqueous solution from said exchange reagent; and F. cathodically electroplating said isolated metal into solution so as to win said isolated metal.

* * * * *